US008580138B2

(12) United States Patent  (10) Patent No.: US 8,580,138 B2
Olson  (45) Date of Patent: Nov. 12, 2013

(54) NANOFLUIDS AND A METHOD OF MAKING NANOFLUIDS FOR GROUND SOURCE HEAT PUMPS AND OTHER APPLICATIONS

(75) Inventor: John Melvin Olson, Boulder, CO (US)

(73) Assignee: ACTA Technology Inc, Boulder, CO (US)

( * ) Notice: Subject to any disclaimer, the term of this patent is extended or adjusted under 35 U.S.C. 154(b) by 0 days.

(21) Appl. No.: 13/229,737

(22) Filed: Sep. 11, 2011

(65) Prior Publication Data

US 2013/0062555 A1    Mar. 14, 2013

(51) Int. Cl.
*C09K 5/00* (2006.01)
*C09K 3/18* (2006.01)

(52) U.S. Cl.
USPC ............... 252/74; 252/70; 252/71; 977/810; 977/811

(58) Field of Classification Search
USPC .................. 252/70, 71, 74; 977/810, 811
See application file for complete search history.

(56) References Cited

U.S. PATENT DOCUMENTS

| | | | | |
|---|---|---|---|---|
| 2,984,629 | A * | 5/1961 | Loftman et al. | 516/86 |
| 5,246,624 | A * | 9/1993 | Miller et al. | 516/86 |
| 6,068,769 | A * | 5/2000 | Iio et al. | 210/315 |
| 6,858,157 | B2 * | 2/2005 | Davidson et al. | 252/70 |
| 6,949,600 | B2 * | 9/2005 | Schierlmann | 524/430 |
| 7,348,298 | B2 * | 3/2008 | Zhang et al. | 508/113 |
| 7,399,353 | B2 * | 7/2008 | Nun et al. | 106/401 |
| 8,192,643 | B2 * | 6/2012 | Zheng et al. | 252/73 |
| 2002/0086909 | A1 * | 7/2002 | Brown | 516/98 |
| 2006/0189113 | A1 * | 8/2006 | Vanheusden et al. | 438/597 |
| 2008/0287326 | A1 * | 11/2008 | Zhang et al. | 508/113 |
| 2008/0302998 | A1 * | 12/2008 | Hong et al. | 252/74 |

FOREIGN PATENT DOCUMENTS

| | | | | |
|---|---|---|---|---|
| JP | 09040983 A | * | 2/1997 | C10M 105/56 |
| JP | 2009114343 A | * | 5/2009 | C09K 17/02 |

OTHER PUBLICATIONS

Gun'ko et al. "Surface electric and titration behaviour of fumed oxides", Colloids and Surfaces A: Physiochem. Eng. Aspects, 240 (2004), 9-25. Available online May 10, 2004. see "Gun'ko_ColloidsandSurfaces_2004".pdf.*
Xia and Yu "Intriguingly high convective heat transfer enhancement of nanofluid coolants in laminar flows", Physics Letters A, 374 (2010), 2566-2568. Available online Apr. 18, 2010. see "Xie_PhysLettA_2010".pdf.*
Lin and Chung, "Nanostructured fumed metal oxides for thermal interface pastes", J. Mater. Sci, (2007), 42: 9245-9255. Available online Jul. 27, 2007. See "Lin_JMaterSci_2007".pdf.*

(Continued)

*Primary Examiner* — Peter F Godenschwager
*Assistant Examiner* — Jane L Stanley
(74) *Attorney, Agent, or Firm* — Edward Vincent Clancy; Law Office of Edward Clancy

(57) ABSTRACT

This invention covers nanofluids. Nanofluids are a combination of particles between 1 and 100 nanometers, a surfactant and the base fluid. The nanoparticles for this invention are either pyrogenic nanoparticles or carbon nanotubes. These nanofluids improve the heat transfer of the base fluids. The base fluid can be ethylene glycol, or propylene glycol, or an aliphatic-hydrocarbon based heat transfer fluid. This invention also includes a method of making nanofluids. No surfactant is used to suspend the pyrogenic nanoparticles in glycols.

3 Claims, 8 Drawing Sheets

(56) References Cited

OTHER PUBLICATIONS

Peyghambarzadeh et al. "Experimental study of heat transfer enhancement using water/ethylene glycol based nanofluids as a new coolant for car radiators", International Communications in Heat and Mass Transfer, 38 (2011), 1283-1290. Published online Jul. 16, 2011. (see "IntCommHeatMassTrans_2011.pdf").*

* cited by examiner

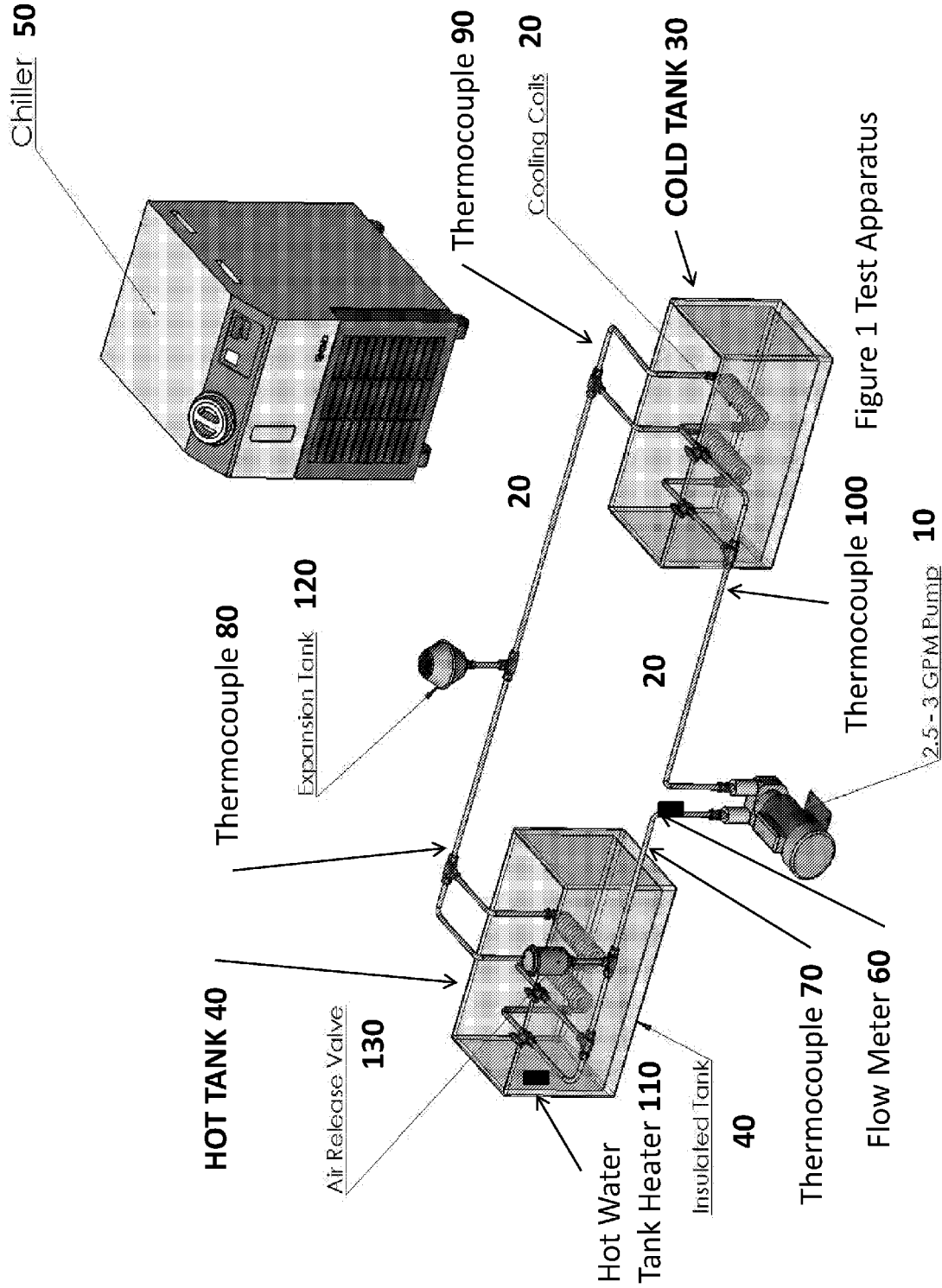

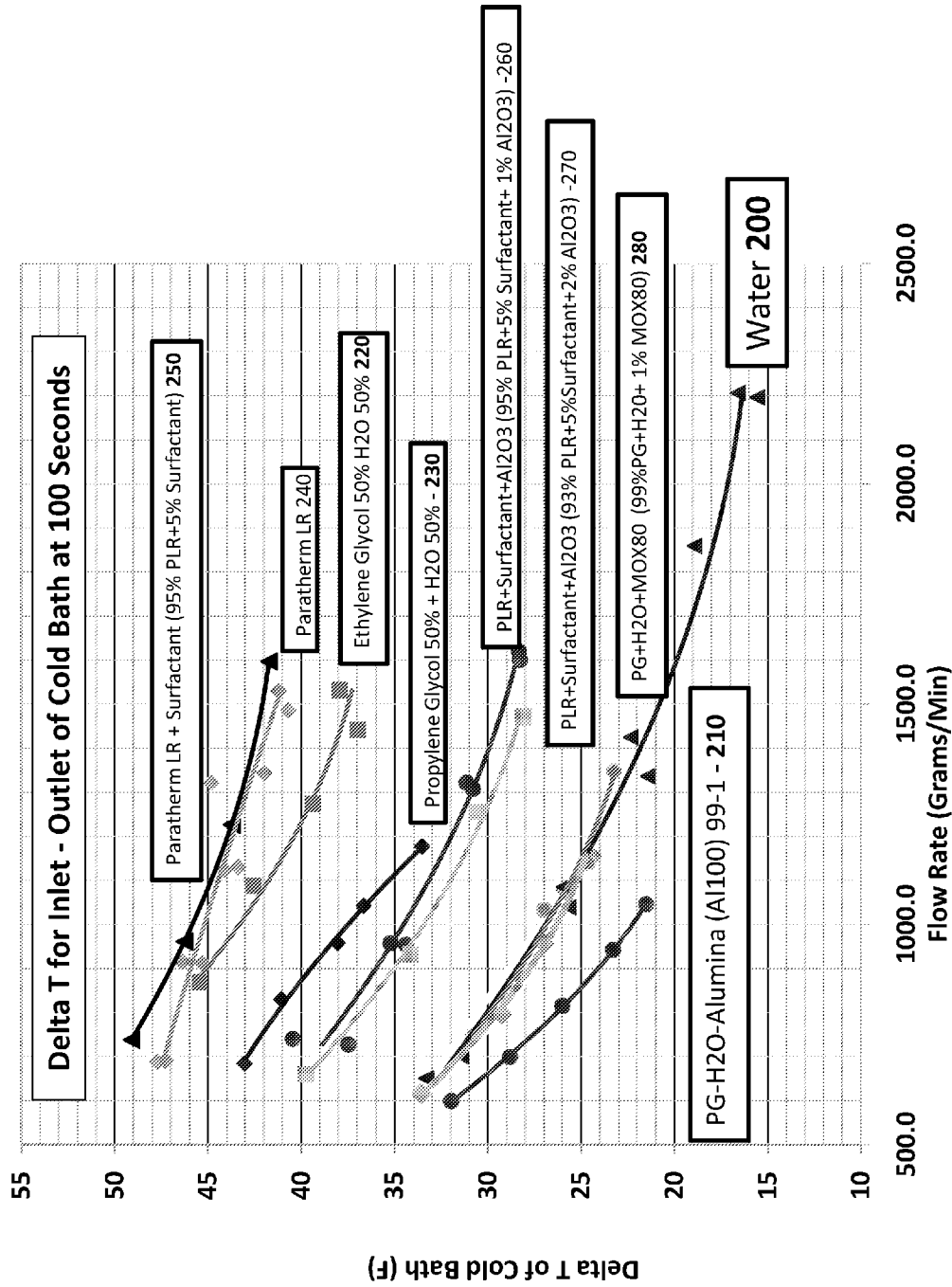
Figure 2 – Delta Temperature of various nanofluids, ethylene glycol, propylene glycol and Paratherm LR

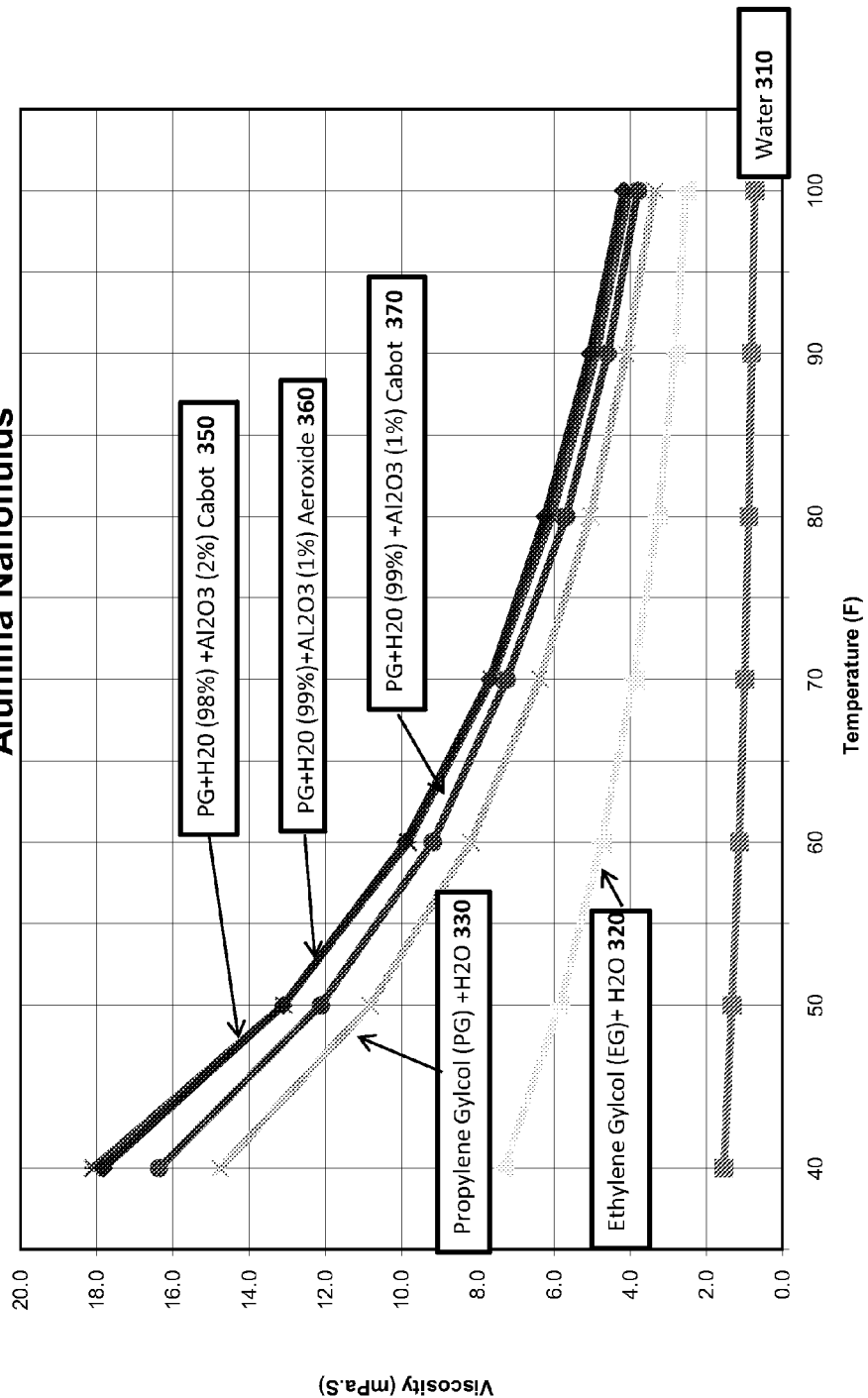

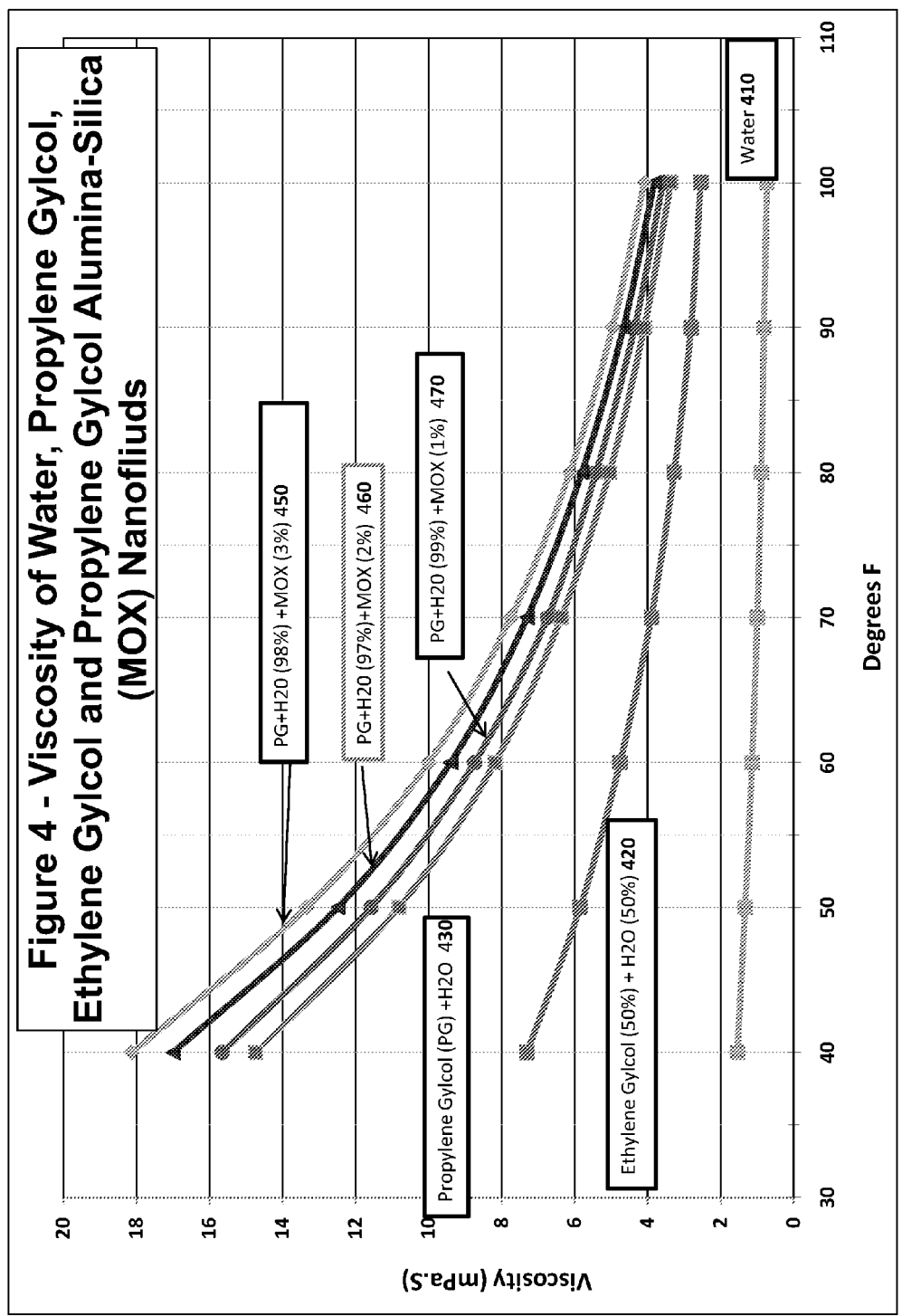

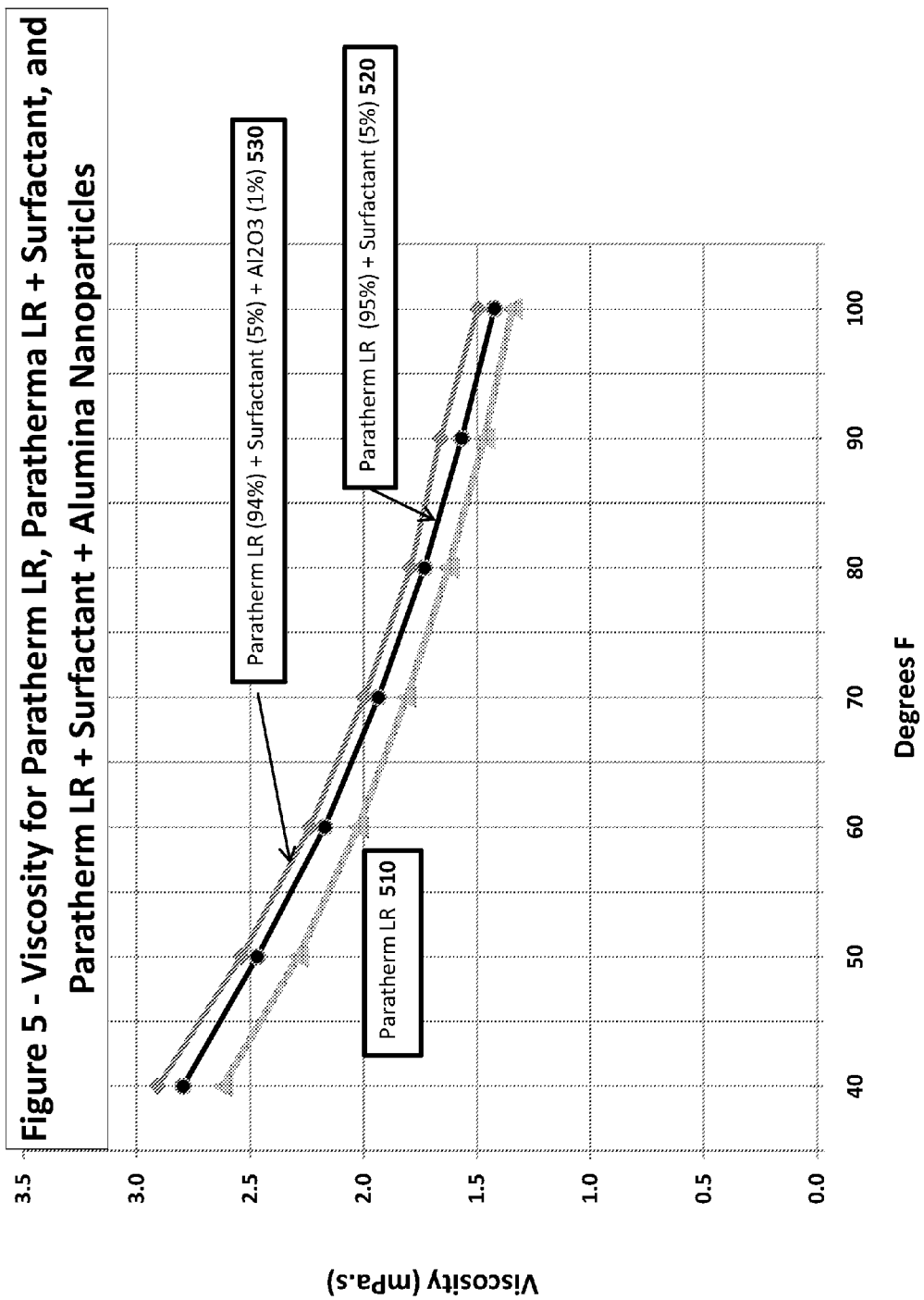

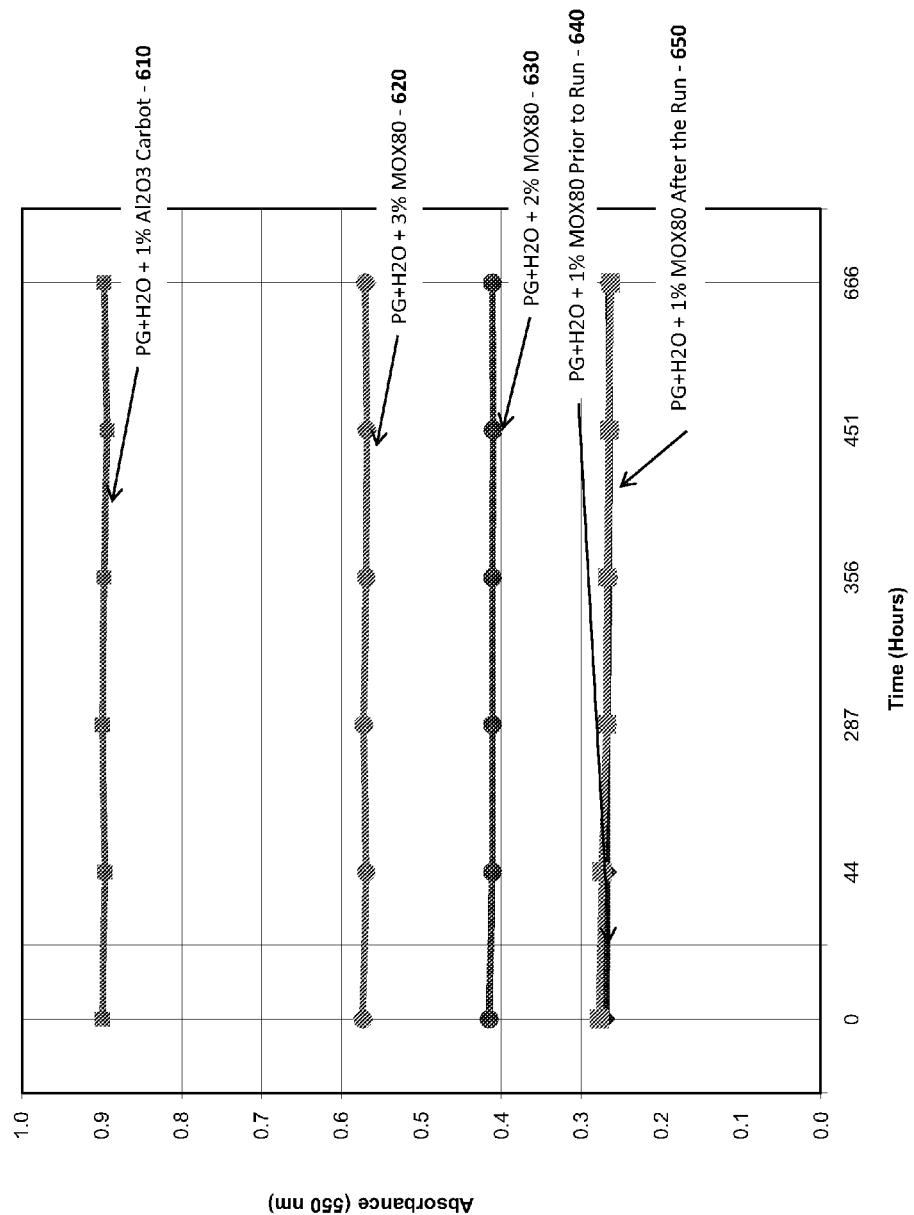

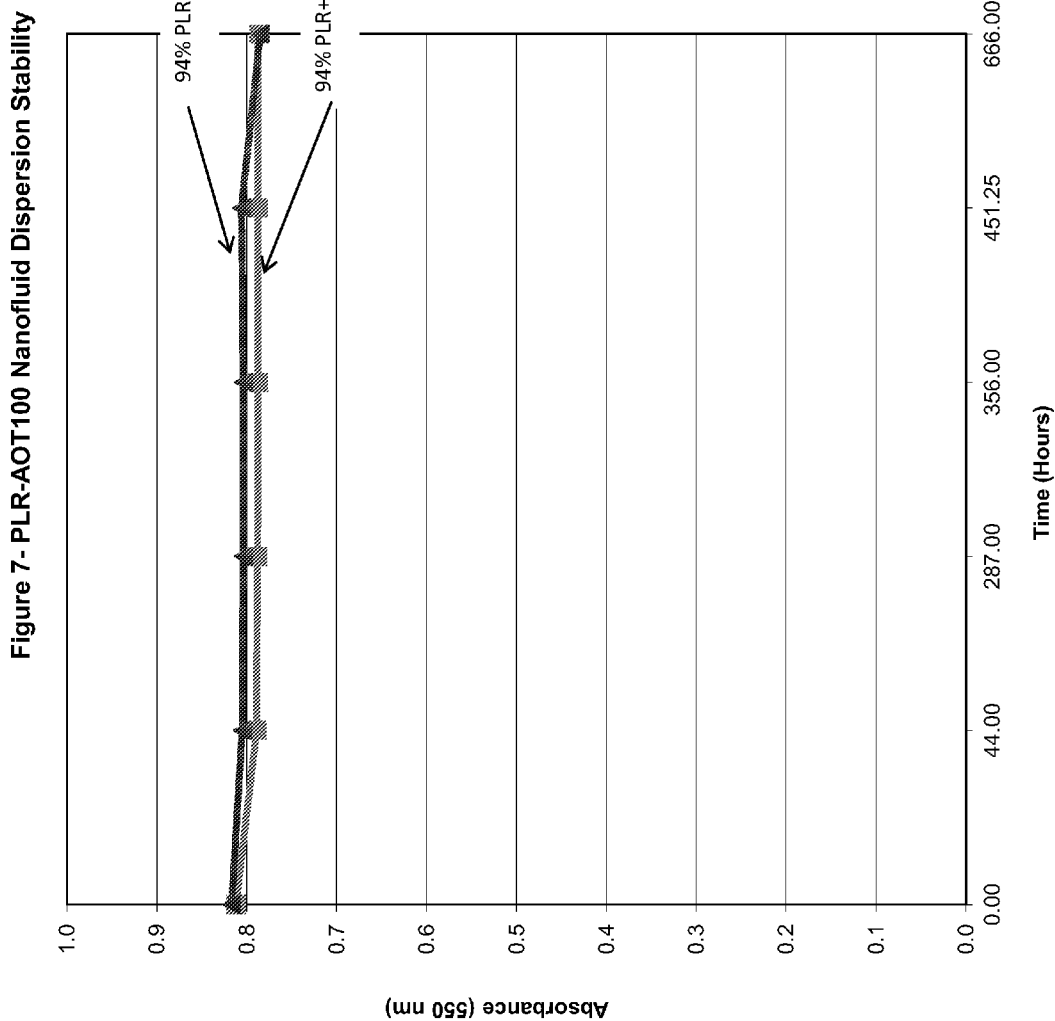

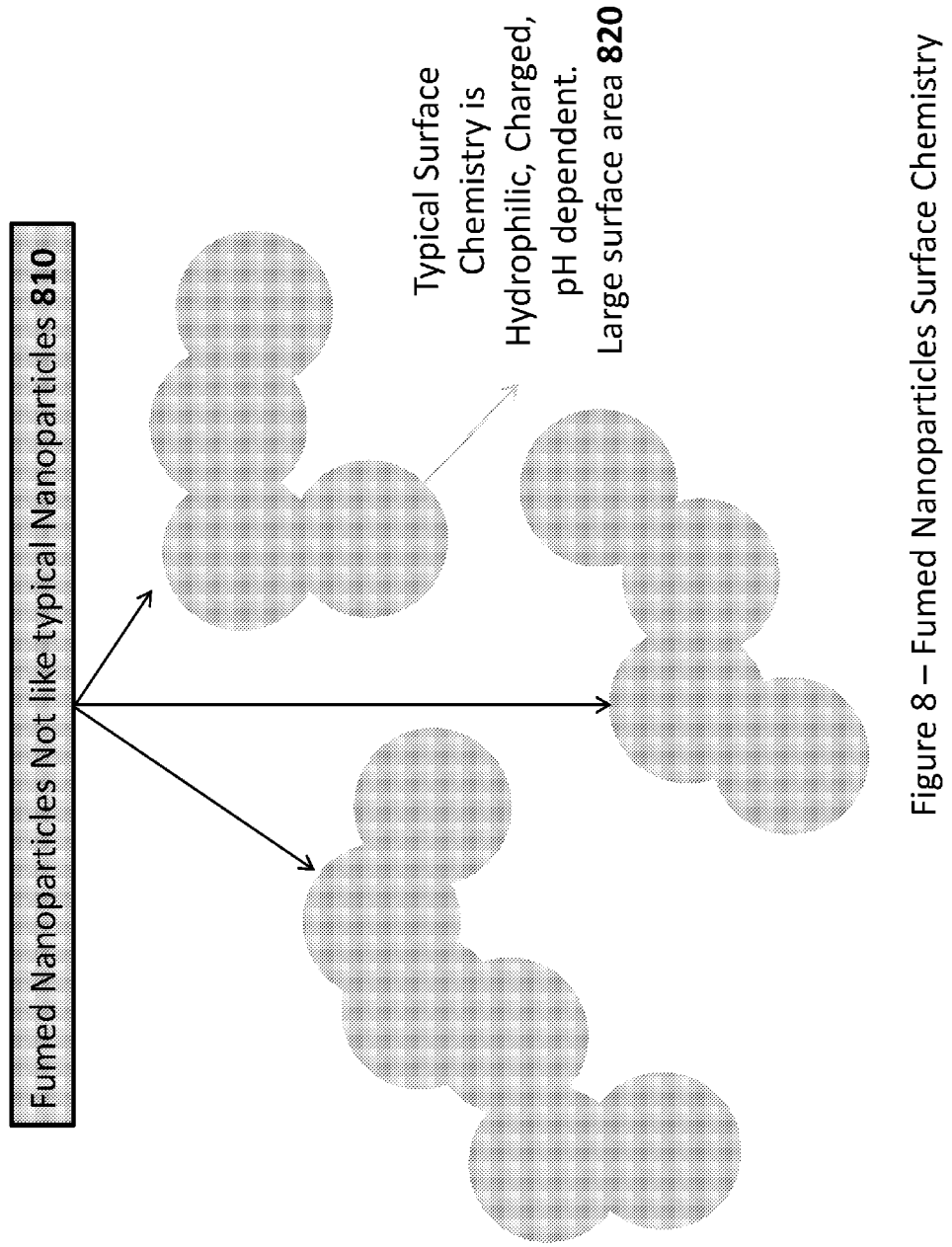
Figure 8 – Fumed Nanoparticles Surface Chemistry

NANOFLUIDS AND A METHOD OF MAKING NANOFLUIDS FOR GROUND SOURCE HEAT PUMPS AND OTHER APPLICATIONS

STATEMENT REGARDING FEDERALLY SPONSORED RESEARCH OR DEVELOPMENT

Research was partially funded under US Environmental Protection Agency Contract EPA-EP-D-11-034. The title of the contract is "A Greener and More Energy Efficient Renewable Energy Resource—Ground Source Heat Pumps."

REFERENCE TO RELATED APPLICATIONS

N/A

BACKGROUND OF THE INVENTION

Conventional geothermal heat pumps (GHPs) have the potential to provide significant energy savings over typical air-source heat pumps or typical furnaces with air conditioners. GHPs are a proven technology and savings in the range of 30 to 60 percent have been documented, but the greatest barrier to acceptance of GHPs in the marketplace is their high initial cost and long payback period.

This invention uses nanofluid in the circulation loop of a GHP that will increase the heat transfer; thereby reducing the installation cost and reduce the operating cost of GNPs. Improved heat transfer will lower the installation cost because the circulation loop can be smaller and the pumping cost will also be less. Nanofluids are not new in fact human blood is a nanofluid. The invention introduces nanoparticles into the circulation loop (propylene glycol or a heat transfer oil) used in today's systems. Prior work has already shown that using nanoparticles are an excellent method to improve thermal conductivity in water, ethylene glycol, engine oil and refrigerant applications. Improved thermal conductivity enhancement of 40% or more has been reported with only a 0.10% nanoparticles concentration.

The most common method to increasing the heat transfer rate in a cycle is to use extended heat transfer surfaces for exchanging heat with a heat transfer fluid. This approach produces an undesirable increase in the sizes of the heat exchange device and a larger circulation loop. In ground source heat pumps the main heat exchanger is the bore field or pond. In addition, the inherent poor thermodynamic properties of conventional heat transfer fluid (ethylene or propylene glycol) limits the amount of heat transfers. Therefore, there is a need to develop advanced cooling techniques and innovative heat transfer fluid with better heat transfer performance than those presently available.

It is well known that metallic solids possess order of magnitude higher thermal conductivity than conventional heat transfer fluids. For example the thermal conductivity of copper is 3000 times greater than engine oil. In the past, researchers have tried to increase the thermal conductivity of base fluids by suspending micro or large sized solid particles into the fluid, because the thermal conductivity of solids such as copper is so much higher than that of liquids. Prior researchers expected that the metallic particles would significantly increase the heat transfer. Unfortunately, when this has been tried, large size particles follow Maxwell's theory in that they lack stability and settle out of the liquid. The suspension also causes additional flow resistance and possible erosion problems which are negative effects of using a mixture of a base liquid with suspended large metallic particles.

Nanotechnology provides new opportunities to produce material with an average particle size below 100 nm (nanometer). These nanoparticles do not follow Maxwell's theory and have a much large relative surface area as compared to conventional particles. Unlike suspension discussed above, nanoparticles not only improve heat transfer, they also may reduce flow friction, improve the kinetics of the heat transfer and can be made to remain in a stable suspension for long periods of time.

It has been documented that the addition of nanoparticles has remarkably enhanced the thermal conductivity of the base liquid. These nanofluids are quite different from conventional two-phase flow mixtures discussed earlier. It has been demonstrated that nanoparticles can improved thermal conductivity by a 2 to 3 fold increase. In addition, nanoparticles resist sedimentation, as compared to larger particles, due to Brownian motion and inter-particle forces.

The focus of the patent is on ground source heat pumps (GHP); yet, the proposed technique can also be used as a cost-effective method for improving absorption cooling, engine oil cooling, water and glycol cooling systems, and all water systems HVAC (Heating, Ventilation, Air Conditioning). This invention uses propylene glycol, ethylene glycol, or food grade heat transfer oil as the fluid. These nanofluids can be used in any other heat transfer application such as solar collectors, solar concentrators and other heat transfer applications. In the preferred embodiment the food grade heat transfer oil is Paratherm LR™. Paratherm LR™ is an aliphatic-hydrocarbon based heat transfer fluid. This invention is not limited to Paratherm LR™ but rather includes all heat transfer oil that are aliphatic-hydrocarbon based. This invention covers ethylene glycol as well as propylene glycol. Environmentally friendly propylene glycol is always a better choice of fluid but this invention will work for both ethylene and propylene glycols.

Dr. Steven Choi from US Department of Energy's (DOE's) Argonne Labs is usually credited for inventing nanofluids [U.S. Pat. No. 6,221,275B1]. Dr. Choi documented the increase in thermal conductivity. Over time it has been recognized that thermal conductivity is not the best figure of merit to evaluate nanofluids because the nanoparticles tend to increase the viscosity of the nanofluid. Increased viscosity can increase pumping cost and can reduce heat transfer because the boundary layer will increase. Argonne Labs is patenting a new nanofluid and describes a testing apparatus to measure heat transfer properties [Pub. No. US2011/0001081 A1]. Their apparatus measures more properties than thermal conductivity. It has been recognized that thermal conductivity of the nanofluid is not a good indicator of heat transfer performance of a fluid. The Argonne lab device does not have an isothermal cold tank and does not model GHPs. Argonne labs now recommends using a new figure of merit for nanofluids called the Mouromtseff (Mo) number which is a function of the density, viscosity, thermal conductivity and specific heat and not thermal conductivity alone.

$$Mo = \frac{(\rho^{0.8} * k^{0.67} * cp^{0.33})}{\mu^{0.46}}$$

where $\rho$ is the density, k is the thermal conductivity, Cp is the specific heat and $\mu$ is the dynamic viscosity.

The nanofluids covered by this invention have a high Mo figure of merit for heat transfer.

The typical GHP consists of a heat pump, circulating pump, heat exchanger, bore field or pond heat exchanger, and a circulating fluid. This invention improves that heat transfer of the circulating fluid in the bore field or pond by providing a nanofluid that reduces energy consumption and does not have the harmful effects of ethylene glycol. Ethylene glycol is a hazardous material that might be consumed by people should the ethylene glycol get into the drinking water because of a leak in the bore field or pond or through leaks in the fittings and seals of the circulating loop system.

BRIEF SUMMARY OF THE INVENTION

This invention allows nanoparticles to enter the circulating loop of a ground source heat pump. This will improve the heat transfer of the base fluid (glycol or heat transfer oil). The invention also includes a method of making a nanofluid used in GHPs.

For glycols, no surfactant is used to suspend the nanoparticles. This is novel. Other researcher use surfactants to suspend the nanoparticles in glycols and this invention covers the use of nanoparticles that do not require any surfactants when used in glycols. Instead we use pryogenic nanoparticles.

The possible nanoparticles to be used with this invention are pryogenic (fumed) alumina oxide ($Al_2O_3$), fumed titanium oxide ($TiO_2$), fumed ferric oxide ($Fe_2O_3$), and fumed Aerosil™. Aerosil™ contain approximately 2% $AL_2O_3$ with 98% $SiO_2$. One skilled in the art knows the fumed process. For example fumed silica, also known as pyrogenic silica because it is produced in a flame, consists of microscopic droplets of amorphous silica fused into branched, chainlike, three-dimensional secondary particles which then agglomerate into tertiary particles. The resulting powder has an extremely low bulk density and high surface area. The fumed nanoparticles are not generally spherical nanoparticles and have large surface area to volume ratios. For Aerosil™ nanoparticles the percent of $Al_2O_3$ with $SiO_2$ can vary from 0.01% to 28%. SpectraAL® 100 is an example of fumed alumina. It has a positive charge. The fumed nanoparticles cause the nanofluid to have a shear thinning behavior. These nanofluids have the property that once a shear force is applied to the nanofluid with fumed nanoparticles, the nanofluid becomes thinner and once the shear force is removed the nanofluid becomes thicker. This behavior with its time dependent recovery is called thixotropy. Thixotropic behavior is a key to many of the benefits of using fumed nanofluids. The pumping of the fumed nanofluid in the ground source loop will make the nanofluid thinner and require less energy to pump the nanofluid.

For heat transfer oils, such as Paratherm LR, a surfactants to be used is Aerosol™ OT (Aerosol OT is Dioctyl sodium sulfosuccinate or docusate sodium), or Ninate 411™ (INinate 411 is Sopropyl Amine Branched Dodecylbenezene Sulfonate). The surfactant weight percent will be from 0.1 to 15% of the weight of the fluid (weight percent) for heat transfer oils with fumed nanoparticles are used.

The nanoparticles can also be carbon nanotubes, multiwall or single wall in gylcols. In the preferred embodiment the nanoparticles will be carbon nanotubes called BAYTUBES C150P™. The percent of carbon nanotubes (CNTs) will be less than 10% of the fluid volume of the nanofluid. In the preferred embodiment, the nanoparticles size of 5 to 20 nm with an inner diameter of 2-5 nm. The length is 1 to greater than 10 μm. The weight percent of CNT in the preferred embodiment is 0.01%. the surfactant when using glycols can be either Sodium Lignosulonate or Tetronic 1307™ (Ethylene Diamine Alkoxtlate Block Copolymer). The weight percent of surfactant can vary from 0.1% to 5%. In the preferred embodiment 1% Sodium Lignosulonate was used with 0.1% carbon nanotubes by weight with propylene glycol.

The method of making the glycol nanofluid is to sonicated the mixture of fumed nanoparticles with the glycol. For example, the power rating should be 80 to 115 watts for 350 ml for 1% fumed nanoparticles. The temperature of the mixture should be monitored during sonication. The maximum temperature should be 120 C. The preferred duration of sonication is 1 hour for 1% nanoparticles being added. The sonication should be pulsed, with approximately 30 seconds power on followed by approximately 30 seconds power off. Larger concentrations will require more sonication and optical density readings and a Scanning Electron Microscope (SEM) should be used to verify that the mixture has been well dispersed and the nanoparticles are not settling out of solution over time. Centrifuging the mixture can also be done to check if the sonication period selected is sufficient to give a stable nanofluid. The nanofluid should be centrifuged from 4000 G (Gravity) to 8000 G to insure a stable solution. A high speed dispersion equipment such as a Cowles dissolver can also be used.

Mechanical impingement and inline sonicators may also be used to break up the nanoparticles and form a nanofluid. With mechanical impingement high velocity fluid with nanoparticles are pumped against a stationary plate. The fluid impinges onto the plate thereby break up the CNTs or fumed nanoparticles into solution.

Adding nanoparticles to glycol and water mixtures the pH of the mixture should be monitored. The glycol nanofluid may not be able to hold anymore fumed nanoparticles because of pH. A solution to this problem is to add a buffer agent or chemical base to the mixture. This will allow more nanoparticles to be added. When one skilled in the art determines that the additional nanoparticles are not going into solution (dispersion is not stable) this problem can be caused by one of two reasons; the sonication time may not be sufficient or the pH of the mixture may be too low. For example, for fumed silica oxide at a pH of 2.3 the iso-electric point of fumed silica is reached. When the pH is below 2.3 the surface takes on a positive charge and a pH above 2.3 the surface takes on a negative surface charge which generates sufficient electrostatic repulsion charge to hold the particles far enough apart. At pH above 10.8 the fumed silica goes into solution. The fumed nanoparticles have a unique surface chemistry. Hydroxyl groups cover approximately 40% of the surface of the nanoparticles making the surface hydrophilic. The fumed particles are not spherical but rather a chain of particles with large surface area.

Optical density readings should be taken over time to insure that dispersion is stable. A spectrophotometer should be used at a wave length of 450 to 600 m. In the preferred embodiment 550 nm is used. One skilled in the art can use a full scan of the nanofluid with the spectrophotometer and where the wave length of absorbance changes the most (the bend in the curve) that is the most sensitive part of the curve and should be used to monitor dispersion stability.

DESCRIPTION OF THE DRAWING

FIG. 1—Depicts a test apparatus that modeled a GHP system, pond type.

FIG. 2—Depicts the temperature difference for various nanofluids, water, ethylene glycol, propylene glycol and Paratherm LR heat transfer oil).

FIG. 3—Depicts the viscosity of Water, Propylene Glycol, Ethylene Glycol and Alumina Nanofluids FIG. 4—Depicts the viscosity of Water, Propylene Glycol, Ethylene Glycol and Propylene Glycol Alumina-Silica (MOX) Nanofluids FIG. 5—Depicts the viscosity of Paratherm LR, Paratherma LR plus Surfactant, and Paratherm LR plus Surfactant plus Alumina Nanoparticles FIG. 6—Depicts Propylene Glycol plus H20 Nanofluids Dispersion Stability Over Time FIG. 7—Depicts Paratherma LR (PRL) plus Surfactant (AOT) Nanofluids Dispersion Stability FIG. 8—Surface chemistry of fumed nanoparticles

DETAILED DESCRIPTION OF THE INVENTION

FIG. 1 illustrates a test apparatus for testing circulating fluids to be used in GHP. The circulating loop 20 connects the bore field or the pond to the heat pump's condenser in GHPs. A constant speed, two-speed or variable speed pump 10 circulates the circulation fluid usually propylene or ethylene glycol in the loop 20. The invention is a new type of nanofluid to be used in the loop 20 that increase the heat transfer. The test apparatus models a typical heat pump and has a cold tank 30 and hot tank 40. A chiller 50 can be used in the cold tank to maintain near isothermal temperatures in the cold tank 30. The goal is to create a heat transfer environment similar to ground source heat pump, where 85 F loop circulating fluid leaves the heat pump and enters the ground loop or pond loop. In the test apparatus the hot tank 40 presents the condenser of the GHP and the cold tank 30 represents the bore field or pond. In this test apparatus the water temperature in the cold tank 30 is kept nearly constant at 34 F. A Chiller 50 and or ice is used in the cold tank 30 to model the earth or pond. A flow meter 60 records the flow rate and thermocouples 70, 80, 90 and 100 record the temperatures entering and leaving the cold and hot water tanks 30, 40. A heater 110 is used in the hot tank 40 to reheat the loop fluid back up to 85 F. The test apparatus also includes an expansion tank 120, a flow meter 60 and an air release valve or open tank 130 to allow entrained air to escape the system. In the preferred embodiment a computer data acquisition system was used to collect all the temperature, pump power and flow readings.

As depicted in FIG. 2, the temperature drop of the fluid in the cold tank 30 was recorded over various flow rates for various fluids. Water is an excellent heat transfer fluid with a high specific heat and low viscosity. Water 200, propylene glycol (PG) (50% PG plus water 50%) 230, ethylene glycol (EG) (EG 50% by weight with 50% water) 220 and Paratherma LR (PLR) 240 were all run in the test apparatus in order to determine the baseline heat transfer properties of each fluid. As expected water's 200 heat transfer performance was very good followed by propylene glycol 230, ethylene glycol 220 and Paratherma LR 240. Water temperature drop in the cold tank 30 is 200, propylene glycol is 210, ethylene glycol is 220, Nanofluid made from fumed alumina 1% and propylene glycol is 230, PG plus Mox 80™ nanofluid is 280, Paratherm LR™ plus surfactant (AOT) is 250, Paratherm LR™ with a surfactant AOT™ and 1% fumed alumina is 260, Propylene glycol with a surfactant (Hexadecyl Trimethylammonium Bromide) with 0.1% Bayer C150P multi-wall nanotubes is 270. The surfactant used in 270 could also be Tergitol TMN-3™. Fluids that have heat transfer properties close to water are excellent heat transfer fluids. FIG. 2 illustrates that PG with 1% fumed alumina nanofluid 210 had a greater heat transfer properties than water 200. Paratherma LR with just a surfactant (95% PLR with 5% Surfactant) 250 did not have as good heat transfer properties as the base fluid Paratherma LR 240. This confirms that the surfactant alone is not responsible for the improvement in heat transfer performance of Paratherm LR 240 and was expected since the surfactant increased the viscosity of the Paratherm LR 240. Paratherm LR nanofluids (PLR plus surfactant plus nanoparticles) performance is shown on 260 and 270. The Paratherm LR nanofluids out performed both the base ethylene 220 and propylene 230 glycols. The Paratherm LR nanofluids 260, 270 have significant increase in heat transfer properties over the base Paratherm LR 240. The Paratherma LR nanofluid with 2% nanoparticles 270 only slightly outperformed the Paratherm LR with 1% 260. The reason why 270 was only marginally better than 260 may be explained by insufficient sonication or too low a pH.

FIG. 3 illustrates the viscosity of water 310, Ethylene Glycol (EG 50%) plus water (50%) 320, Propylene Glycol (PG) plus water (50%) 330. As expected the viscosity of water 310 is the lowest viscosity followed by ethylene glycol 320 and finally propylene glycol 330. Propylene glycol nanofluids 350, 360, and 370 have higher viscosity than the base propylene glycol 330 as expected. If you increase the percentage of nanoparticles in the fluid the viscosity will also increase. This is illustrated by 370 with 1% alumina nanoparticles as compared to 2% alumina nanoparticles 350.

FIG. 4 illustrates the viscosity of water 410, Ethylene Glycol (EG 50%) plus water (50%) 420, Propylene Glycol (PG) plus water (50%) 430. Propylene glycols with Alumina Silica nanofluids 450, 460, and 470 have higher slightly viscosity than the base propylene glycol 430 as expected. The Propylene Glycol MOX80 (1% Alumina-Silica) nanofluid 470 has a lower viscosity than Propylene Glycol and Alumina (1% Alumina) 370, 360.

FIG. 5 details the increase in viscosity for Paratherm LR 510 when a surfactant 5% is added to the heat transfer oil 520. The Paratherm LR nanofluid with 1% Al2O3 and 5% also has increased viscosity 530 over just Paratherm LR 510. Although the viscosity of the nanofluid is increased the viscosity is still lower than the viscosity of water 410, ethylene glycol 420 and propylene glycol 430.

FIG. 6 illustrates the method of checking the stability of the nanofluid dispersion over time. If the dispersion was not stable, the spectrophotometer readings would decrease over time. The propylene glycol nanofluids all showed a stable solution 610, 620, 630, 640 and 650.

FIG. 7 illustrates that the Paratherma LR nanofluid with 1% alumina nanoparticles was stable over time 710, 720. The optical density was checked for a sample that was used to obtain heat transfer properties (after the run) 710 and for another that was not pumped in the heat transfer apparatus (prior to the run) 720. The lack of change of the optical density indicates a stable suspension.

FIG. 8 depicts the surface chemistry of fumed nanoparticles 810. Fumed nanoparticles 810 are not like spherical nanoparticles. Fumed nanoparticles are charged particles where the pH can vary the charge on the surface of the particles. The like charge helps the nanoparticles to be well dispersed if the proper amount of energy is initially used to disperse the fumed particles. These fumed are hydrophilic and are stable in both propylene and ethylene glycols mixtures.

What is claimed is:

1. A stable nanofluid comprising a glycol-water mixture wherein said glycol-water mixture comprises water present from 6 to 90 volume % of the mixture and a plurality of fumed nanoparticles present in the said nanofluid in the range of 1 to 10 weight percent, wherein said nanofluid is free of a surfactant holding the said fumed nanoparticles in suspension, wherein said nanofluid has a pH range of 2.31 to 10.30.

2. The stable nanofluid of claim 1, wherein the fumed nanoparticles are selected from the group consisting of: fumed alumina oxide ($Al_2O_3$), fumed titania oxide ($TiO_2$), fumed silica oxide ($SiO_2$), and a mixture of fumed alumina with fumed silica oxide.

3. The stable nanofluid of claim 1, wherein the glycol is selected from the group consisting of: propylene glycol and ethylene glycol.

\* \* \* \* \*